(12) United States Patent
Xu et al.

(10) Patent No.: US 12,009,663 B2
(45) Date of Patent: Jun. 11, 2024

(54) OFFSHORE WIND FARM LOW-FREQUENCY ALTERNATING-CURRENT UNCONTROLLED RECTIFICATION ELECTRIC POWER TRANSMISSION SYSTEM

(71) Applicant: Zhejiang University, Hangzhou (CN)

(72) Inventors: Zheng Xu, Hangzhou (CN); Yingjie Tang, Hangzhou (CN); Zheren Zhang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 260 days.

(21) Appl. No.: 17/771,358

(22) PCT Filed: Aug. 5, 2020

(86) PCT No.: PCT/CN2020/107048
§ 371 (c)(1),
(2) Date: Apr. 22, 2022

(87) PCT Pub. No.: WO2021/082586
PCT Pub. Date: May 6, 2021

(65) Prior Publication Data
US 2022/0393473 A1  Dec. 8, 2022

(30) Foreign Application Priority Data
Oct. 30, 2019  (CN) .......................... 201911045253.X

(51) Int. Cl.
*H02J 3/36* (2006.01)
*F03D 9/25* (2016.01)
(Continued)

(52) U.S. Cl.
CPC ................ *H02J 3/36* (2013.01); *F03D 9/257* (2017.02); *H02J 3/381* (2013.01); *H02J 3/46* (2013.01);
(Continued)

(58) Field of Classification Search
CPC .... H02J 3/36; H02J 3/381; H02J 3/46; H02M 7/483
See application file for complete search history.

(56) References Cited

U.S. PATENT DOCUMENTS

| 2010/0156189 A1* | 6/2010 | Fishman | ................... | H02J 3/44 |
| | | | | 307/77 |
| 2015/0333525 A1* | 11/2015 | Choi | ........................ | H02J 4/00 |
| | | | | 700/287 |
| 2016/0013653 A1* | 1/2016 | Dorn | ...................... | H02M 5/42 |
| | | | | 363/35 |

FOREIGN PATENT DOCUMENTS

| CN | 105790305 A | 7/2016 |
| CN | 107634543 A | 1/2018 |

(Continued)

*Primary Examiner* — Jue Zhang
*Assistant Examiner* — Afework S Demisse
(74) *Attorney, Agent, or Firm* — Morse, Barnes-Brown & Pendleton, P.C.; Martin Z. Zhang, Esq.

(57) ABSTRACT

The present disclosure discloses an offshore wind farm low-frequency alternating-current uncontrolled rectification electric power transmission system, comprising an onshore converter station and an offshore alternating-current system. The offshore alternating-current system comprises wind turbine generators, alternating-current submarine cables, a confluence bus, and offshore booster stations; the onshore converter station comprises a wind field side alternating-current bus, an alternating-current system side alternating-current bus, an alternating-current filter, an energy dissipation device, a rectifier, and a converter; the rectifier is composed of a three-phase six-pulse uncontrolled rectifier bridge, and the converter may be an MMC or an LCC; the rated frequency of the offshore alternating-current system is selected to be close to 10 Hz.

8 Claims, 10 Drawing Sheets

(51) Int. Cl.
*H02J 3/38* (2006.01)
*H02J 3/46* (2006.01)
*H02M 7/483* (2007.01)

(52) U.S. Cl.
CPC ......... H02M 7/483 (2013.01); *H02J 2300/28* (2020.01)

(56) References Cited

FOREIGN PATENT DOCUMENTS

| | | |
|---|---|---|
| CN | 108270234 A | 7/2018 |
| CN | 110829478 A | 2/2020 |
| EP | 2495839 A1 | 9/2012 |

* cited by examiner

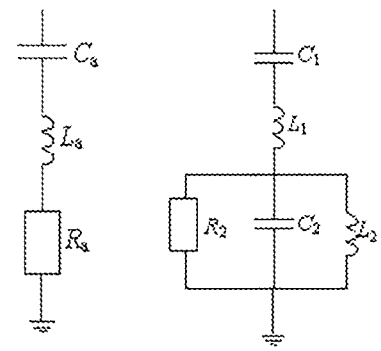
Single tuning    Double tuning    Triple tuning    Capacitor
Fig. 4A      Fig. 4B      Fig. 4C      Fig. 4D
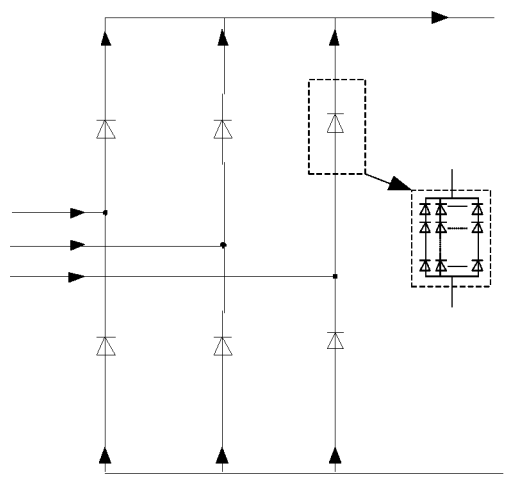
FIG. 5

OFFSHORE WIND FARM LOW-FREQUENCY ALTERNATING-CURRENT UNCONTROLLED RECTIFICATION ELECTRIC POWER TRANSMISSION SYSTEM

CROSS REFERENCE TO RELATED APPLICATION

This patent application is a national stage of International Application No. PCT/CN2020/107048, filed on Aug. 5, 2020, which claims the benefit and priority of Chinese Patent Application No. 201911045253.X filed on Oct. 30, 2019 with the China National Intellectual Property Administration, entitled "OFFSHORE WIND FARM LOW-FREQUENCY ALTERNATING-CURRENT UNCONTROLLED RECTIFICATION ELECTRIC POWER TRANSMISSION SYSTEM", the disclosures of which are incorporated by reference herein in their entirety as part of the present application.

TECHNICAL FIELD

The present disclosure relates to the technical field of power system transmission and distribution, in particular, to an offshore wind farm low-frequency alternating-current uncontrolled rectification electric power transmission system.

BACKGROUND ART

In recent years, the problems of energy depletion and environmental pollution have become increasingly severe, while renewable energy generation is pollution-free and sustainable, so its application prospects are extremely broad. Wind power generation is one of the most mature and most developed power generation methods in the renewable energy generation technology. With the development and application of wind power technology, the scale of wind farms is becoming larger and larger. Due to restrictions of land resources and wind energy resources, large-scale wind farms are often located in remote areas or offshore far away from the main grid. At present, the development of onshore wind power in some countries tends to be saturated while offshore wind energy has not yet been exploited, which has huge development potential.

From a global perspective, wind energy reserves are huge, about 2,000 trillion kilowatts. Asia's wind energy resources account for about 25% of the world's total, that is, 500 trillion kilowatts. The resources are distributed in Russia, China and other countries. China's wind energy is mainly distributed in three regions of Northeast, Northwest, and North China, as well as the southeast coast. With the continuous development of science and technology, the total amount of wind energy that can be used is also very impressive. According to the calculation, survey and analysis on wind energy by the China Meteorological Administration, the wind energy that can be developed in China is at least 20 trillion kilowatts, so there is huge room for development. On the one hand, the development and utilization of wind energy has great potential. On the other hand, due to the progress of wind power generation technology, wind energy will gradually replace traditional fossil energy and play an important role in power development and energy exploitation.

Most offshore wind farms that have been put into operation currently are directly connected through AC systems; however, due to the limitation of the capacitive charging current of AC submarine cables, long-distance large-capacity wind power cannot be directly sent through the AC systems. According to the research conclusions from foreign scholars, if only the influence of capacitor charging current is considered, the maximum transmission distances of active power of 380 kV AC submarine cable at 50, 15, 10, 5 and 1 Hz frequencies are 140, 465, 630, 1280 and 14945 km respectively; the smaller the transmission frequency, the further the AC power can be transmitted. Under the current technical conditions, the high voltage direct current (HVDC) system is a suitable technical solution for the transmission of offshore wind power, and almost all of the offshore wind powers that have been put into production adopt a Voltage Source Converter based High Voltage Direct Current Transmission (VSC-HVDC) system.

The flexible DC transmission system includes an offshore converter stations, and the cost of the offshore platforms and equipment in the station are relatively high. In order to further reduce the cost of the offshore wind power transmission system, in recent years, the research on low-cost converters has become more and more popular in academia and industry. Compared with the offshore stations that use modular multilevel converters (MMC), low-cost converters can reduce the volume and weight of offshore stations to a certain extent; but due to the existence of the offshore stations, it still cannot reduce the cost of the flexible DC transmission system fundamentally. Therefore, a feasible solution is to use a rated frequency far less than 50 Hz in the offshore AC system, so that the offshore converter station is placed on land by increasing the length of the AC submarine cables, so as to greatly reduce the cost of the entire offshore wind power transmission system.

So far, there are few documents to research the low-frequency AC transmission system of offshore wind power. To this end, it is necessary to study the offshore wind farm low-frequency alternating-current uncontrolled rectification transmission system.

SUMMARY

In view of the above, the present disclosure provides an offshore wind farm low-frequency alternating-current uncontrolled rectification electric power transmission system; this solution, by making the rated frequency of the offshore AC system much lower than the 50 Hz level, and by increasing the length of the AC submarine cable, merges the offshore converter station and the onshore converter station into a new onshore converter station, so as to avoid the use of offshore platforms, and greatly reduces the project cost, and it has huge application value in actual projects.

In order to realize the above objectives, the present disclosure provides the following solutions:

An offshore wind farm low-frequency alternating-current uncontrolled rectification electric power transmission system, comprising an onshore converter station and an offshore alternating-current AC system.

The offshore AC system comprises: wind turbine generators, AC submarine cables, and offshore booster stations; wherein the wind turbine generators are respectively connected to low voltage sides of the offshore booster stations through respective AC submarine cables, and high voltage sides of the offshore booster stations are connected to a wind farm side AC bus of the onshore converter station.

The onshore converter station comprises a wind farm side AC bus, a converter transformer, a grid-side AC bus, an AC filter, an energy dissipation device, a rectifier and an inverter; wherein the wind farm side AC bus is connected to an AC side of the rectifier through the converter transformer, a DC side positive port of the rectifier is connected to a DC side positive port of the inverter, a DC side negative port of the rectifier is connected to a DC side negative port of the inverter, and an AC side of the inverter is connected to the grid-side AC bus through the converter transformer.

A rated frequency of the offshore AC system and a rated frequency of the onshore converter station are both 8-20 Hz, and a rated frequency of the booster transformer in each offshore booster station and a rated frequency of the rectifier side converter transformer in the onshore converter station adapt a rated frequency of the offshore AC system and a rated frequency of the onshore converter station.

Preferably, the onshore converter station adopts a pseudo bipolar structure or a true bipolar structure; when the pseudo bipolar structure is adopted, the onshore converter station only installs a grounding device at a valve side of converter transformer of the inverter; when the true bipolar structure is adopted, a rectifier and an inverter are provided at a positive pole of the onshore converter station; a rectifier and an inverter are provided at the negative pole of the onshore converter station; a high voltage end of the positive rectifier is directly connected to a high voltage end of the positive inverter, and a low voltage end of the negative rectifier is directly connected to a low voltage end of the negative inverter; a low voltage end of the positive rectifier is directly connected to a high voltage end of the negative rectifier, and a connection point between the low voltage end of the positive rectifier and the high voltage end of the negative rectifier serves as a neutral point of the DC side of the rectifier; the low-voltage end of the positive inverter is directed connected to the high-voltage end of the negative inverter, and the connection point of the low voltage end of the negative inverter and the high voltage end of the negative inverter serves as a neutral point of the DC side of the inverter, and at least one of the neutral points of the DC side of the rectifier and the inverter needs to be connected to a ground electrode.

Preferably, each wind turbine generator adopts a full-power converter type wind turbine based on permanent magnet synchronous generator.

Preferably, the AC filter is connected to the wind farm side AC bus; the AC filter uses single tuning, double tuning, triple tuning or pure capacitor forms; a sum of reactive power of all AC filters under the rated fundamental voltage is 30% of a rated DC power of the onshore converter station.

Preferably, the rectifier is composed of two rectifier units connected in series, each rectifier unit uses a three-phase six-pulse uncontrolled rectifier bridge, and each bridge arm in the three-phase six-pulse uncontrolled rectifier bridge is composed of several diodes connected in series and parallel;

The three-phase six-pulse uncontrolled rectifier bridge comprises: two rectifier units; the converter transformers on the rectifier side comprise: a first converter transformer and a second converter transformer;

Wherein one of the rectifier units is connected to the first converter transformer using a Y0/Y wiring mode; the other rectifier unit is connected to the second converter transformer using a Y0/Δ wiring mode; a valve side phase difference between the first converter transformer and the second converter transformer is 30°.

Preferably, when the inverter uses a modular multi-level converter, the inverter uses the Y0/Δ wiring mode to connect to the converter transformer; when the inverter uses 12-pulse line commutated converter, the inverter use the Y0/Y wiring mode to connect to the first converter transformer, and the inverter uses the Y0/Δ wiring mode to connect to the second converter transformer.

Preferably, the energy dissipation device comprises: an AC side energy dissipation device and a DC side energy dissipation device; the AC side energy dissipation device is directly connected to the wind farm side AC bus; the AC side energy dissipation device is provided by a step-down transformer, Delta-connected cascaded thyristors, and energy dissipation resistors; a rated frequency of the AC side energy dissipation device is the same as the rated frequency of the offshore AC system; the DC side energy dissipation device is installed between the positive and negative poles on the DC side of the inverter, and the DC side energy dissipation device is composed of cascaded IGBTs and the energy dissipation resistors; for an onshore converter station with a pseudo-bipolar structure, only one DC energy dissipation device needs to be installed, and the high voltage end of the DC energy dissipation device is connected to the positive pole of the DC side of the inverter; the low voltage end of the DC energy dissipation device is connected to the negative pole of the DC side of the inverter; for the onshore converter station with a true bipolar structure, A DC energy dissipation device is installed between the positive pole of the DC side of the inverter and the neutral point of the DC side, and a DC energy dissipation device is installed between the negative pole of the DC side of the inverter and the neutral point of the DC side.

Preferably, the grid-side converter of each wind turbine generator is controlled in constant power mode, and the grid-side converter of each wind turbine generator comprises a control system; the control system comprising four parts of: a power controller, an outer loop controller, an inner loop controller, and a trigger link; the power controller, the outer loop controller, the inner loop controller and the trigger link all include two control dimensions of d-axis and q-axis; the input of the d-axis component of the power controller is an active power reference value $P_{ref}$ and an active power measured value P of the wind turbine generator, and a difference between the active power reference value $P_{ref}$ and the active power measured value P is output as $\Delta U_{dref}$ after being controlled by proportional-integral (PI) controller; $\Delta U_{dref}$ is added with a d-axis voltage rated value $U_{dref0}$ to obtain a d-axis voltage reference value $U_{dref}$; an input of the q-axis component of the power controller is a reactive power reference value $Q_{ref}$ and a measured reactive power value Q of the wind turbine generator, a difference value between the reactive power reference value $Q_{ref}$ and a reactive power measure value Q is output as a q-axis voltage reference value $U_{qref}$ after proportion control; an input of the outer loop controller is the grid-side converter AC outlet voltage d-axis component $U_d$, voltage q-axis component $U_q$, the d-axis voltage reference value $U_{dref}$ and the q-axis voltage reference value $U_{qref}$; a difference value between the d-axis voltage reference value $U_{dref}$ and the voltage d-axis component $U_d$ are output as d-axis current reference value $i_{dref}$ after being controlled by PI controller; a difference value between the q-axis voltage reference value $U_{qref}$ and the voltage q-axis component $U_q$ is output as q-axis current reference value $i_{qref}$ after being controlled by PI controller; an input of the inner loop controller is the grid-side converter AC outlet current d-axis component $i_d$, the current q-axis component $i_q$, the d-axis current reference value $i_{dref}$, the q-axis current reference value $i_{qref}$, the voltage d-axis component $U_d$ and the voltage q-axis component $U_q$; an output result of a difference value between the d-axis current reference value $i_{dref}$ and the current d-axis component $i_d$ after being controlled by PI controller is added with $U_d - i_q^* X$, to obtain a d-axis voltage modulation wave $U_{vdref}$; an output result of a difference value between the q-axis current reference value $i_{qref}$ and the current q-axis component $i_q$ after being controlled by PI controller is added with $U_q + i_q^* X$, to obtain a q-axis voltage modulation wave $U_{vqref}$; wherein X is a connect reactance of the grid-side converter; the input of the trigger link is the d-axis voltage modulation wave $U_{vdref}$ and the q-axis voltage modulation wave $U_{vqref}$; the d-axis voltage modulation wave $U_{vdref}$ and the q-axis voltage modulation wave $U_{vqref}$ are subjected to dq/abc conversion and PWM modulation, and output trigger signals for each switching device in the grid-side converter.

According to the specific embodiments provided by the present disclosure, the present disclosure discloses the following technical effects:

(1) For offshore wind power transmission occasions, the present disclosure proposes an offshore wind farm low-frequency alternating-current uncontrolled rectification transmission system. Compared with the conventional flexible DC transmission solutions, it makes full use of the higher technical maturity of the AC transmission solutions and can be used to guide the design of future projects.

(2) The present disclosure is different from the current flexible DC transmission solutions. By reducing the rated frequency of the offshore AC system and increasing the length of the AC submarine cables, it merges the offshore converter stations and the land converter stations into a new land converter station, so as to avoid the use of offshore platforms, which greatly reduces the project cost, and has huge application value in actual projects.

BRIEF DESCRIPTION OF THE DRAWINGS

In order to explain the embodiments of the present disclosure or the technical solutions in the prior art more clearly, the following will briefly introduce the accompanying drawings required in the embodiments. Obviously, the accompanying drawings in the following description are only some of the present disclosure; for those of ordinary skill in the art, other drawings can be obtained based on these drawings without creative efforts.

FIGS. 4A-4D is a topological structural schematic view of the AC filter of the onshore converter station of the present disclosure;

FIG. 5 is a topological structural schematic view of the uncontrolled rectifying unit of the onshore converter station of the present disclosure;

DETAILED DESCRIPTION OF THE EMBODIMENTS

Figure 1:
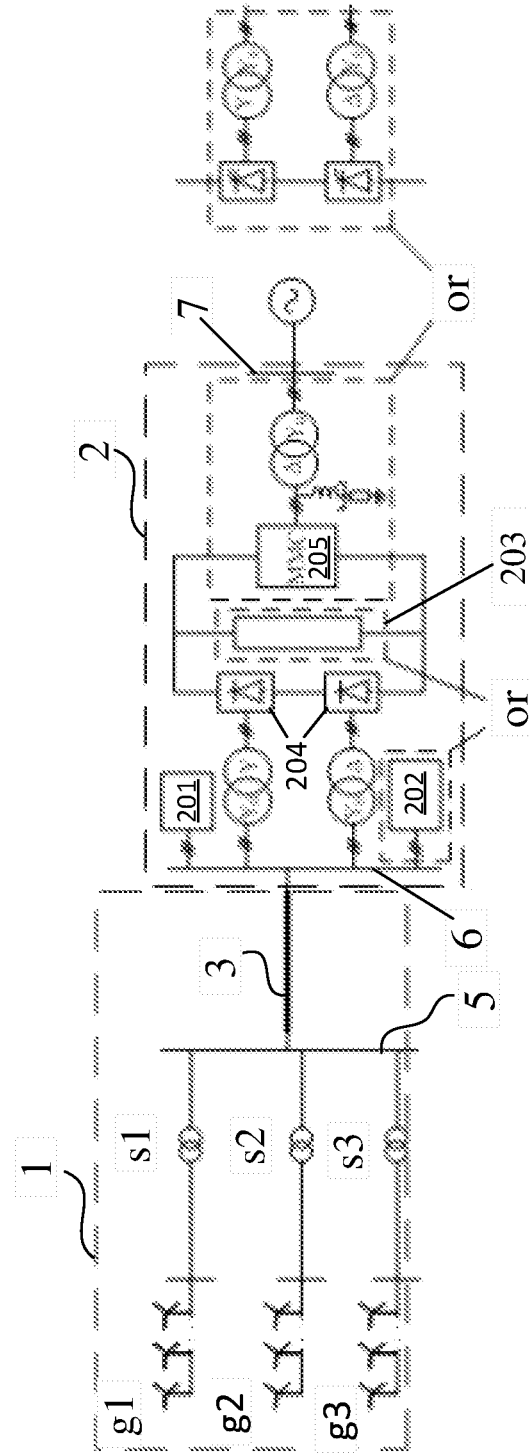
FIG. 1 is a structural schematic view of an offshore wind farm low-frequency alternating-current uncontrolled rectification electric power transmission system (pseudo bipolar) of the present disclosure.

The technical solutions in the embodiments of the present disclosure will be described clearly and completely in conjunction with the accompanying drawings in the embodiments of the present disclosure. Obviously, the described embodiments are only a part of the embodiments of the present disclosure, not all the embodiments. Based on the embodiments of the present disclosure, all other embodiments obtained by those of ordinary skill in the art without creative efforts shall fall within the protection scope of the present disclosure.

The objective of the present disclosure is to provide an offshore wind farm low-frequency alternating-current uncontrolled rectification electric power transmission system, so as to greatly reduce project costs and increase the application values in the actual projects.

In order to make the above objects, features and advantages of the present disclosure more obvious and understandable, the present disclosure will be further described in detail below with reference to the accompanying drawings and specific embodiments.

The offshore wind farm low-frequency alternating-current uncontrolled rectification electric power transmission system provided by the present disclosure comprises an onshore converter station and an offshore alternating-current AC system.

The offshore AC system comprises: wind turbine generators, AC submarine cables, and offshore booster stations; wherein the wind turbine generators are respectively connected to low voltage sides of the offshore booster stations through respective AC submarine cables, and high voltage sides of the offshore booster stations are connected to a wind farm side AC bus of the onshore converter station.

The onshore converter station comprises a wind farm side AC bus, a converter transformer, a grid-side AC bus, an AC filter, an energy dissipation device, a rectifier and an inverter; wherein the wind farm side AC bus is connected to an AC side of the rectifier through the converter transformer, a direct-current DC side positive port of the rectifier is connected to a DC side positive port of the inverter, a DC side negative port of the rectifier is connected to a DC side negative port of the inverter, and an AC side of the inverter is connected to the grid-side AC bus through the converter transformer.

A rated frequency of the offshore AC system and a rated frequency of the onshore converter station are both 8-20 Hz, and a rated frequency of the booster transformer in each offshore booster station and a rated frequency of the rectifier side converter transformer in the onshore converter station adapt a rated frequency of the offshore AC system and a rated frequency of the onshore converter station.

In an embodiment, the onshore converter station preferably adopts a pseudo bipolar structure or a true bipolar structure; when the pseudo bipolar structure is adopted, the onshore converter station only installs a grounding device at a valve side of converter transformer of the inverter; when the true bipolar structure is adopted, a rectifier and an inverter are provided at a positive pole of the onshore converter station; a rectifier and an inverter are provided at the negative pole of the onshore converter station; a high voltage end of the positive rectifier is directly connected to a high voltage end of the positive inverter, and a low voltage end of the negative rectifier is directly connected to a low voltage end of the negative inverter; a low voltage end of the positive rectifier is directly connected to a high voltage end of the negative rectifier, and a connection point between the low voltage end of the positive rectifier and the high voltage end of the negative rectifier serves as a neutral point of the DC side of the rectifier; the low-voltage end of the positive inverter is directed connected to the high-voltage end of the negative inverter, and the connection point of the low voltage end of the negative inverter and the high voltage end of the negative inverter serves as a neutral point of the DC side of the inverter, and at least one of the neutral points of the DC side of the rectifier and the inverter needs to be connected to a ground electrode.

In an embodiment, the wind turbine generator preferably adopts a full-power converter type wind turbine based on a permanent magnet synchronous generator.

In an embodiment, the AC filter is preferably connected to the wind farm side AC bus; the AC filter uses single tuning, double tuning, triple tuning or pure capacitor forms; a sum of reactive power of all AC filters under the rated fundamental voltage is 30% of a rated DC power of the onshore converter station.

In an embodiment, the rectifier is preferably composed of two rectifier units connected in series, each rectifier unit uses a three-phase six-pulse uncontrolled rectifier bridge, and each bridge arm in the three-phase six-pulse uncontrolled rectifier bridge is composed of several diodes connected in series and parallel;

The three-phase six-pulse uncontrolled rectifier bridge comprises: two rectifier units; the converter transformers on the rectifier side comprise: a first converter transformer and a second converter transformer;

Wherein one of the rectifier units is connected to the first converter transformer using a Y0/Y wiring mode; the other rectifier unit is connected to the second converter transformer using a Y0/Δ wiring mode; a valve side phase difference between the first converter transformer and the second converter transformer is 30°.

In an embodiment, when the inverter uses a modular multi-level converter, the inverter uses the Y0/Δ wiring mode to connect to the converter transformer; when the inverter uses 12-pulse line commutated converter, the inverter use the Y0/Y wiring mode to connect to the first converter transformer, and the inverter uses the Y0/Δ wiring mode to connect to the second converter transformer.

In an embodiment, the energy dissipation device preferably comprises: an AC side energy dissipation device and a DC side energy dissipation device; the AC side energy dissipation device is directly connected to the wind farm side AC bus; the AC side energy dissipation device is provided by a step-down transformer, Delta-connected cascaded thyristors, and energy dissipation resistors; a rated frequency of the AC side energy dissipation device is the same as the rated frequency of the offshore AC system; the DC side energy dissipation device is installed between the positive and negative poles on the DC side of the inverter, and the DC side energy dissipation device is composed of cascaded IGBTs and the energy dissipation resistors; for an onshore converter station with a pseudo-bipolar structure, only one DC energy dissipation device needs to be installed, and the high voltage end of the DC energy dissipation device is connected to the positive pole of the DC side of the inverter; the low voltage end of the DC energy dissipation device is connected to the negative pole of the DC side of the inverter; for the onshore converter station with a true bipolar structure, A DC energy dissipation device is installed between the positive pole of the DC side of the inverter and the neutral point of the DC side, and a DC energy dissipation device is installed between the negative pole of the DC side of the inverter and the neutral point of the DC side.

In an embodiment, the grid-side converter of each wind turbine generator is preferably controlled by constant power, and the grid-side converter of the wind turbine generator comprises a control system; the control system comprising four parts of: a power controller, an outer loop controller, an inner loop controller, and a trigger link; the power controller, the outer loop controller, the inner loop controller and the trigger link all include two control dimensions of d-axis and q-axis; the input of the d-axis component of the power controller is an active power reference value $P_{ref}$ and an active power measured value P of the wind turbine generator, and a difference between the active power reference value $P_{ref}$ and the active power measured value P is output as $\Delta U_{dref}$ after being controlled by PI controller; $\Delta U_{dref}$ is added with a d-axis voltage rated value $U_{dref0}$ to obtain a d-axis voltage reference value $U_{dref}$; an input of the q-axis component of the power controller is a reactive power reference value $Q_{ref}$ and a measured reactive power value Q of the wind turbine generator, a difference value between the reactive power reference value $Q_{ref}$ and a reactive power measure value Q is output as a q-axis voltage reference value $U_{qref}$ after proportion control; an input of the outer loop controller is the grid-side converter AC outlet voltage d-axis component $U_d$, voltage q-axis component $U_q$, the d-axis voltage reference value $U_{dref}$ and the q-axis voltage reference value $U_{qref}$; a difference value between the d-axis voltage reference value $U_{dref}$ and the voltage d-axis component $U_d$ are output as d-axis current reference value $i_{dref}$ after being controlled by PI controller; a difference value between the q-axis voltage reference value $U_{qref}$ and the voltage q-axis component $U_q$ is output as q-axis current reference value $i_{qref}$ after being controlled by PI controller; an input of the inner loop controller is the grid-side converter AC outlet current d-axis component $i_d$, the current q-axis component $i_q$, the d-axis current reference value $i_{dref}$, the q-axis current reference value $i_{qref}$, the voltage d-axis component $U_d$ and the voltage q-axis component $U_q$; an output result of a difference value between the d-axis current reference value $i_{dref}$ and the current d-axis component $i_d$ after being controlled by PI controller is added with $U_d - i_q * X$, to obtain a d-axis voltage modulation wave $U_{vdref}$; an output result of a difference value between the q-axis current reference value $i_{qref}$ and the current q-axis component $i_q$ after being controlled by PI controller is added with $U_q + i_q * X$, to obtain a q-axis voltage modulation wave $U_{vqref}$; wherein X is a connect reactance of the grid-side converter; the input of the trigger link is the d-axis voltage modulation wave $U_{vdref}$ and the q-axis voltage modulation wave $U_{vqref}$; the d-axis voltage modulation wave $U_{vdref}$ and the q-axis voltage modulation wave $U_{vqref}$ are subjected to dq/abc conversion and PWM modulation, and output trigger signals of each switching device in the grid-side converter.

The following will take the onshore converter station using a pseudo bipolar system as an example, to further describe the offshore wind farm low-frequency alternating-current uncontrolled rectification electric power transmission system provided by the present disclosure. During the specific application, the solution of the present application can also be applied into the onshore converter stations of other structural types.

Figure 2:
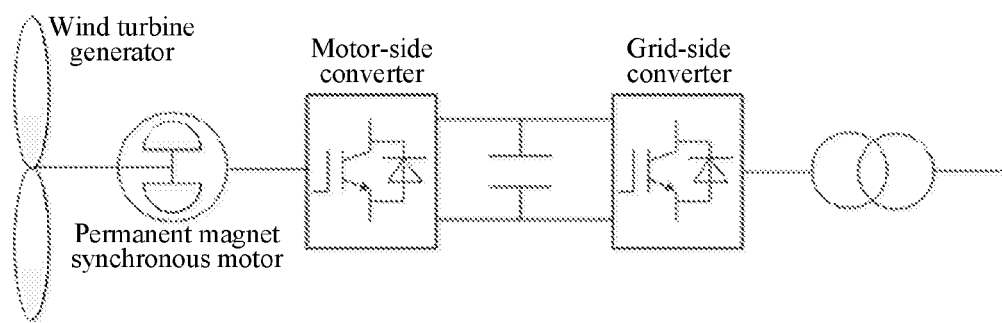
FIG. 2 is a topological structural schematic view of a wind turbine generator of the present disclosure.

As shown in FIG. 1, the offshore wind farm low-frequency alternating-current uncontrolled rectification electric power transmission system comprises an onshore converter station and an offshore alternating-current AC system, wherein:

The offshore AC system comprises: wind turbine generators, AC submarine cables, a confluence bus 5, and offshore booster stations s1-s3; wherein the wind turbine generators are respectively connected to low voltage sides of the offshore booster stations s1-s3 through respective AC submarine cables, and high voltage sides of the offshore booster stations are connected to the confluence bus 5 through the AC submarine cables, and then the confluence bus 5 is connected to the wind farm side AC bus 6 of the onshore converter station 2 through a long-distance AC submarine cable 3 (with a length of more than 100 km). Specially, each wind turbine generator must use a full-power converter type wind turbine based on a permanent magnet synchronous generator, as shown in FIG. 2. Three wind turbine generators are used to be equal to the wind farm connected to the low voltage side of each offshore booster station, and a rated frequency of the offshore AC system is 10 Hz.

In FIG. 1, numbers of 1, 2, and 3 in "wind farm g1", "wind farm g2", "wind farm g3", "booster station s1", "booster station s2", and "booster station s3" denote the first, the second, and the third.

Figure 3:
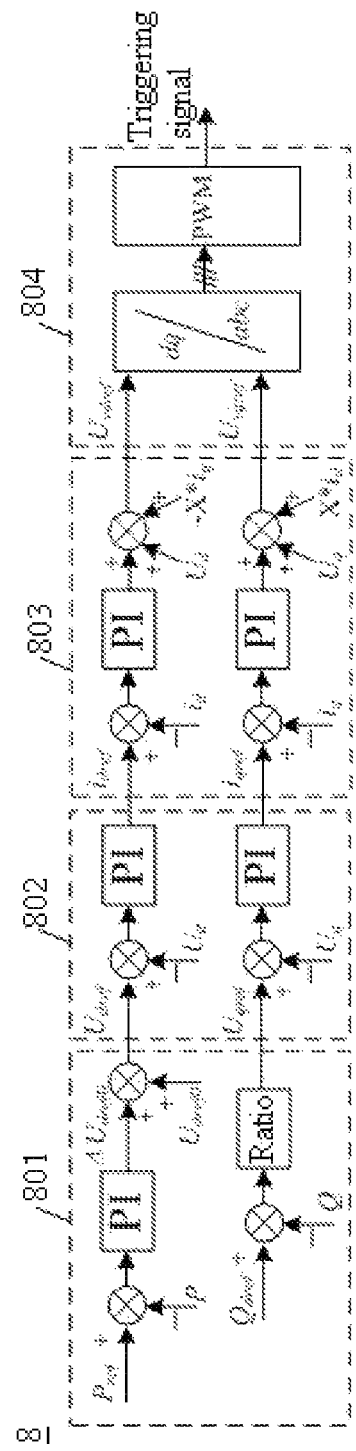
FIG. 3 is a control structural schematic view of the grid-side converter of the wind turbine generator of the present disclosure.

The wind turbine generators is controlled by a fixed power, and the structure of the controller 8 it includes is as shown in FIG. 3. The controller 8 comprises four parts of: a power controller 801, an outer loop controller 802, an inner loop controller 803, and a trigger link 804; each part of the controller includes two control dimensions of d-axis and q-axis; the input and output of the controller are both per-unit values.

The onshore converter station 2 comprises a wind farm side AC bus 6, a converter transformer, a grid-side AC bus 7, an AC filter 201, an energy dissipation device (202, 203), a rectifier 204 and an inverter 205; the wind farm side AC bus 6 is connected to the rectifier 204 through the converter transformer, and a positive DC port of the rectifier 204 is directly connected to the positive DC positive port of the inverter 205. The negative DC port of the rectifier 204 is directly connected to a negative DC port of the inverter 205, and the inverter 205 is connected to the grid-side AC bus 7 through the converter transformer.

The onshore converter station 2 adopts a pseudo bipolar structure, and a grounding device is installed at the valve side of the converter transformer of the inverter 205. When the pseudo bipolar structure is used, a rectifier and an inverter are required, and the positive end of the rectifier is directly connected to the positive end of the inverter, and the negative end of the rectifier is directly connected to the negative end of the inverter.

The AC filter 201 is directly connected to the wind farm side AC bus, which may use single tuning, double tuning, triple tuning or pure capacitor forms; as shown in FIG. 4A and to FIG. 4D, a sum of reactive power of all AC filters under the rated fundamental voltage is 30% of a rated DC power of the converter station.

The rectifier 204 is composed of two rectifier units connected in series, each rectifier unit uses a three-phase six-pulse uncontrolled rectifier bridge, and each bridge arm in the three-phase six-pulse uncontrolled rectifier bridge is composed of several diodes connected in series and parallel, as shown in FIG. 5. The two rectifier units are connected to the converter transformer by Y0 (gide-side)/Y (valve side) wiring mode and Y0 (grid-side)/A(valve side) wiring mode. A phase difference at the valve side of the two converter transformers is 30°, and a rated frequency of the rectifier and the corresponding converter transformer is 10 Hz.

Figure 6:
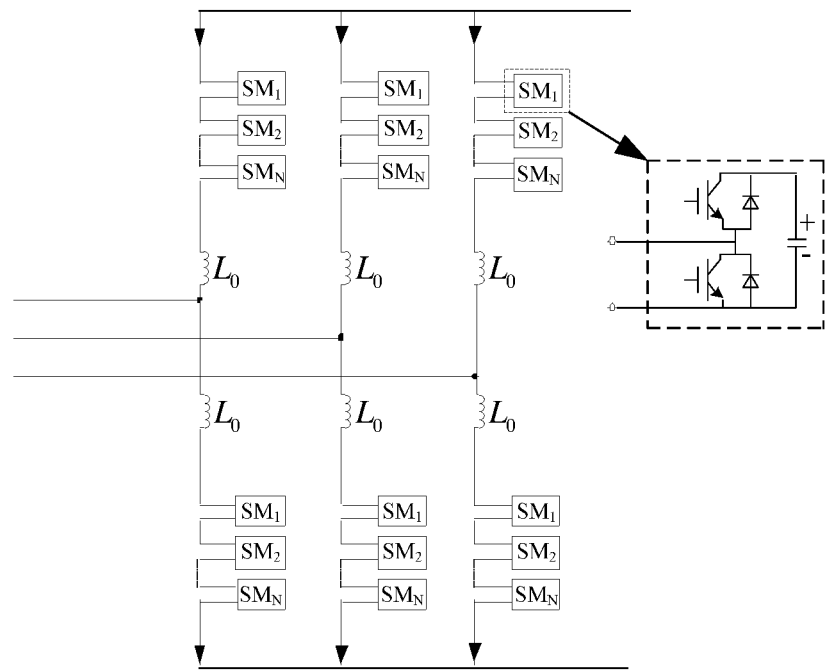
FIG. 6 is a topological structural schematic view of the onshore converter station MMC of the present disclosure.

The inverter 205 may be a modular multilevel converter (MMC) or a line-commuted converter (LCC), and the MMC is adopted in the embodiment as shown in FIG. 6. The inverter 205 is connected to corresponding converter transformer by Y0 (gide-side)/Y (valve side) wiring mode, and the rated powers of the inverter 205 and corresponding converter transformer are 50 Hz.

Figure 7:
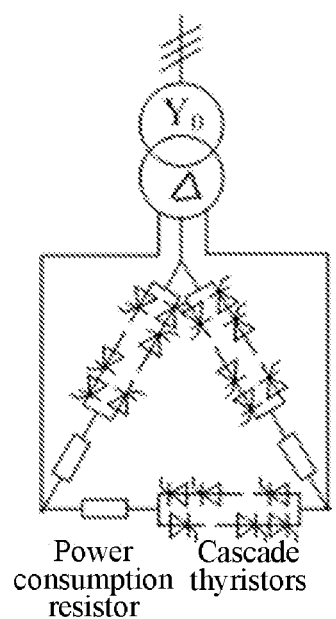
FIG. 7 is a topological structural schematic view of the DC power consumption device of the present disclosure.

The power consumption device comprises an AC side power consumption device 202 and a DC side power consumption device 203. In this implementing solution, an AC power consumption device is used, as shown in FIG. 7. The AC power consumption device is installed on the wind farm side AC bus, and is composed of the cascaded IGBTs and a power consumption electrode.

The system parameters of the implementation is as shown in Table 1:

| Projects | Value |
|---|---|
| Parameters of the Offshore Station | |
| Rated DC voltage (between positive and negative) | 500 kV |
| Rated power of the converter station | 1000 MW |
| Converter transformer ratio | 220 kV/194 kV |
| Converter transformer capacity | 603 MVA |
| Leakage reactance of converter transformer | 0.18 pu |
| Rated AC fundamental frequency | 10 Hz |
| AC filter reactive power at rated fundamental voltage | 100 MVar |
| Number of times of AC filter tuning | 10.98 次, 12.98 次 |
| Parameters of the onshore station | |
| Rated DC voltage (between positive and negative) | 500 kV |
| Rated power of the converter station | 1000 MW |
| Converter transformer ratio | 220 kV/250 kV |
| Converter transformer capacity | 1200 MW |
| Leakage reactance of converter transformer | 0.18 pu |
| Number of sub-modules of bridge arms connected in series | 250 |
| Sub-module capacitance | 13333 uF |
| Reactance of bridge arm | 47.49 mH |
| Smoothing reactance | 0.1 H |
| Rated AC fundamental frequency | 50 Hz |
| Star reactance | 2 H |
| Grounding resistance | 5000 Ω |

-continued

| Projects | Values |
|---|---|
| Offshore booster stations 1~3 | |
| Transformer capacity | 200 MVA/500 MVA/300 MVA |
| Transformer leakage reactance | 0.10 pu |
| Transformer ratio | 35 kV/220 kV |
| Rated fundamental frequency | 150 Hz |
| Equivalent wind turbine generators | |
| Rated power | 200 MW/500 MW/300 MW |
| Rated fundamental frequency of grid-side converter | 10 Hz |
| Long-distance AC cable | |
| Length | 100 km |
| Rated voltage | 220 kV |
| Rated frequency | 10 Hz |

Figure 8A:
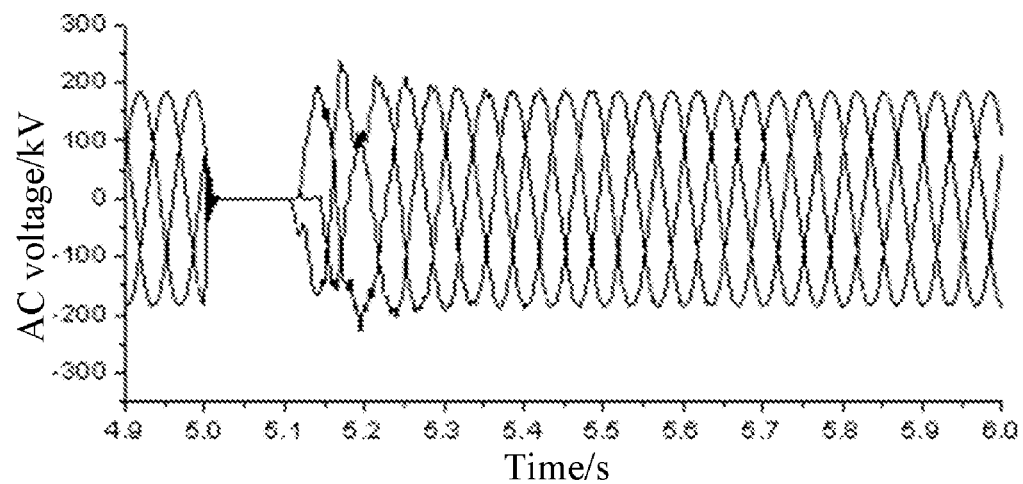
FIG. 8A is a schematic diagram of the AC voltage simulation waveform of the wind farm side AC bus of the onshore converter station of the present disclosure.
Figure 8B:
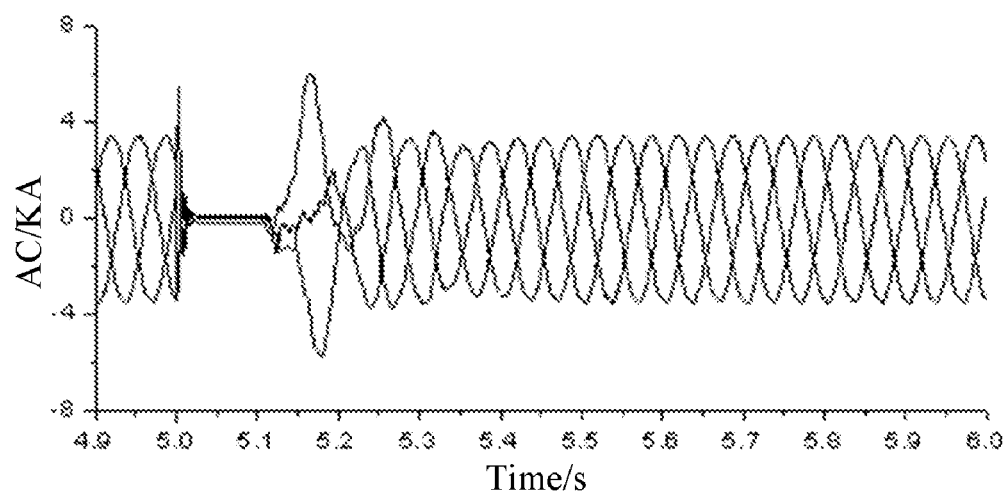
FIG. 8B is a schematic diagram of the AC simulation waveform of the wind farm side AC bus of the onshore converter station of the present disclosure.
Figure 8C:
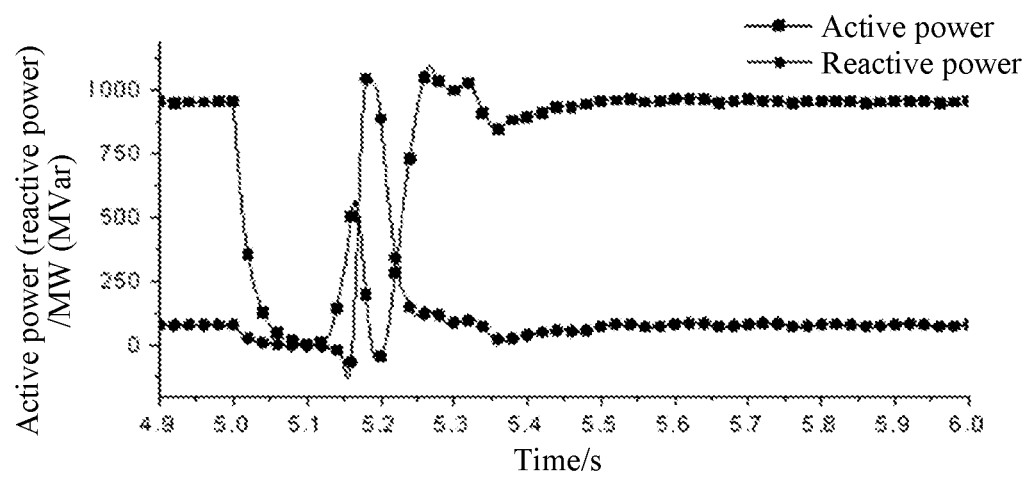
FIG. 8C is a schematic diagram of simulation waveforms of active power and reactive power of the wind farm side AC bus of the onshore converter station of the present disclosure.
Figure 9A:
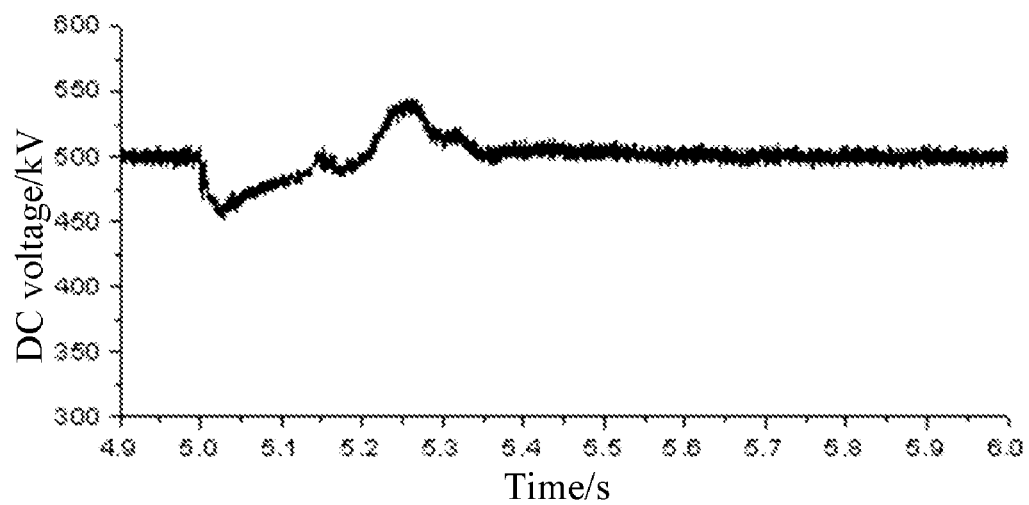
FIG. 9A is a schematic diagram of simulation waveforms of the DC voltage of the system of the present disclosure.
Figure 9B:
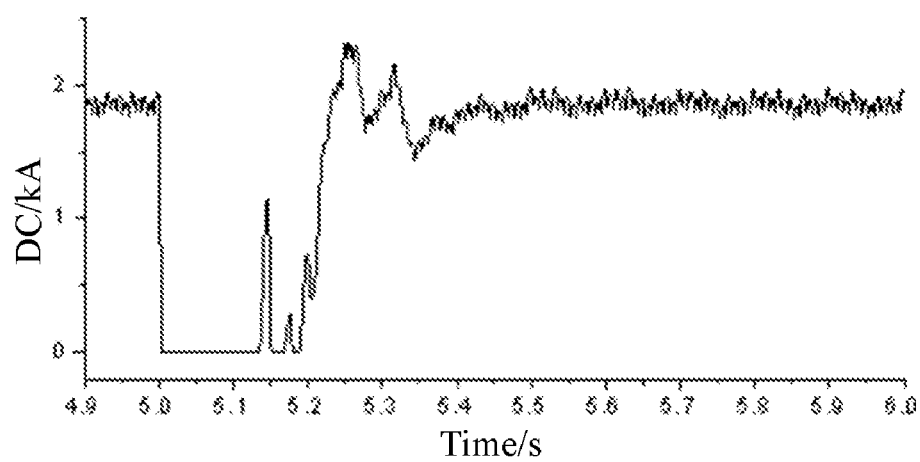
FIG. 9B is a schematic diagram of simulation waveforms of the DC current of the system of the present disclosure.
Figure 10A:
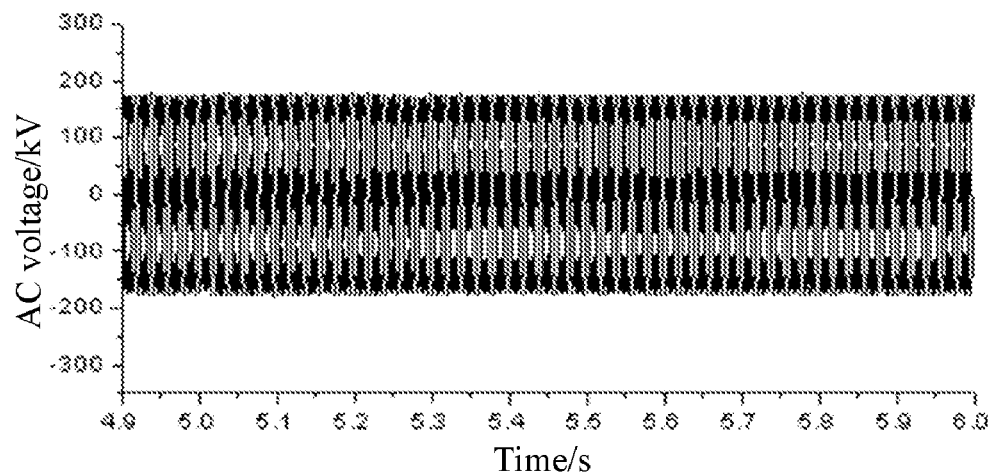
FIG. 10A is a schematic diagram of the simulation waveforms of the AC voltage of the grid-side AC bus of the onshore converter station of the present disclosure.
Figure 10B:
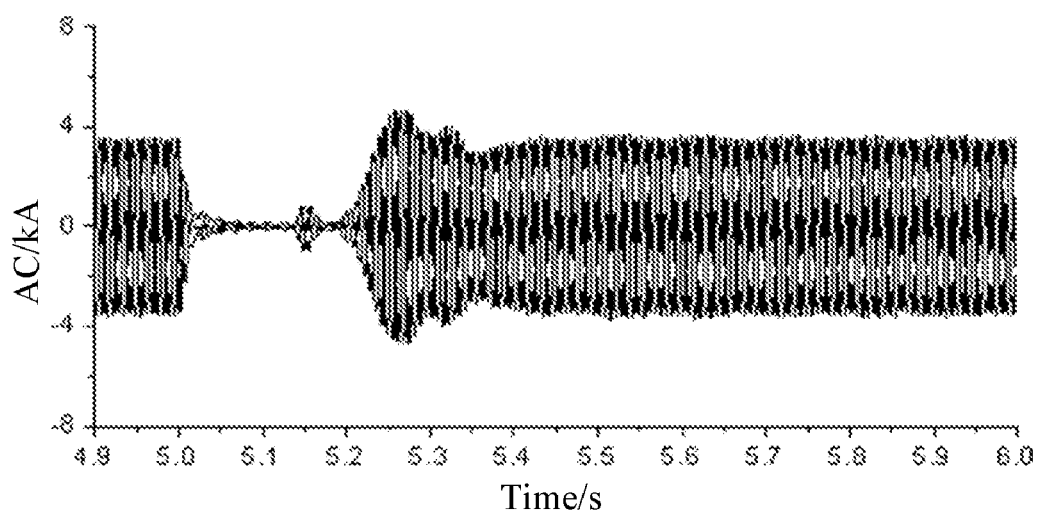
FIG. 10B is a schematic diagram of the simulation waveforms of the AC current of the grid-side AC bus of the onshore converter station of the present disclosure.
Figure 10C:
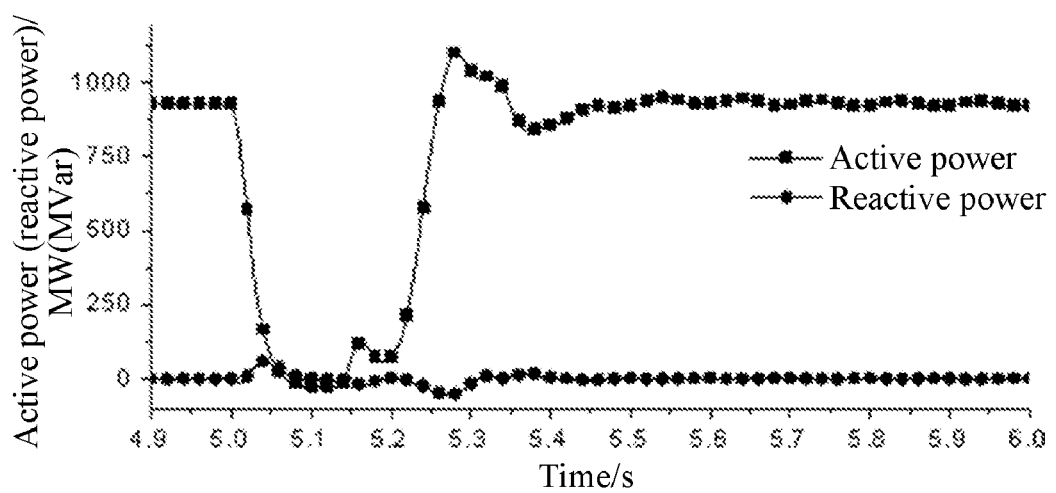
FIG. 10C is a schematic diagram of simulation waveforms of active power and reactive power of the grid-side AC bus of the onshore converter station of the present disclosure.

A corresponding simulation platform is built in the electromagnetic transient simulation software PSCAD/EMTDC to simulate the three-phase metallic short-circuit fault of the confluence bus 5. In the simulation, assume a fault occurs in 5s. FIG. 8A FIG. 8C show simulation results of the key electrical quantities of the wind farm side AC bus; FIG. 9A~FIG. 9B show simulation results of the DC voltage and DC current; FIG. 10A~FIG. 10C show simulation results of the key electrical quantities of the AC system side AC bus. The simulation results prove the effectiveness of the present disclosure.

The various embodiments in the specification are described in a progressive manner. Each embodiment focuses on the differences from other embodiments, and the same or similar parts between the various embodiments can be referred to each other.

Specific examples are used in this text to illustrate the principles and implementation of the present disclosure. The description of the above embodiments is only used to help to understand the method and core idea of the present disclosure; meanwhile, for those of ordinary skill in the art, according to the present disclosure, there will be some changes in the specific implementation and scopes of application. In summary, the content of this specification should not be construed as limitation of the present disclosure.

What is claimed is:

1. An offshore wind farm low-frequency alternating-current uncontrolled rectification electric power transmission system, comprising an onshore converter station and an offshore alternating-current (AC) system, wherein:

the offshore AC system comprises: wind turbine generators, AC submarine cables, and offshore booster stations; wherein the wind turbine generators, each having a grid-side converter, are respectively connected to low voltage sides of the offshore booster stations through respective AC submarine cables, and high voltage sides of the offshore booster stations are connected to a wind farm side AC bus of the onshore converter station;

the onshore converter station comprises a wind farm side AC bus, a converter transformer, a grid-side AC bus, an AC filter, an energy dissipation device, a rectifier and an inverter; wherein the wind farm side AC bus is connected to an AC side of the rectifier through the converter transformer, a direct-current (DC) side positive port of the rectifier is connected to a DC side positive port of the inverter, a DC side negative port of the rectifier is connected to a DC side negative port of the inverter, and an AC side of the inverter is connected to the grid-side AC bus through the converter transformer;

a rated frequency of the offshore AC system and a rated frequency of the onshore converter station are both 8-20 Hz, and a rated frequency of the booster transformer in each of the offshore booster stations and a rated frequency of the rectifier side converter transformer in the onshore converter station adapt a rated frequency of the offshore AC system and a rated frequency of the onshore converter station; and the grid-side converter of each wind turbine generator comprises a control system; the control system comprising a power controller, an outer loop controller, an inner loop controller, and a trigger link; the power controller, the outer loop controller, the inner loop controller and the trigger link all include two control dimensions of d-axis and q-axis; the input of the d-axis component of the power controller is an active power reference value $P_{ref}$ and an active power measured value P of the wind turbine generator, and a difference between the active power reference value $P_{ref}$ and the active power measured value P is output as $\Delta U_{dref}$ after being controlled by proportional-integral (PI) controller; $\Delta U_{dref}$ is added with a d-axis voltage rated value $U_{dref0}$ to obtain a d-axis voltage reference value $U_{dref}$; an input of the q-axis component of the power controller is a reactive power reference value $Q_{ref}$ and a measured reactive power value Q of the wind turbine generator, a difference value between the reactive power reference value $Q_{ref}$ and a reactive power measure value Q is output as a q-axis voltage reference value $U_{qref}$ after proportion control; an input of the outer loop controller is the grid-side converter AC outlet voltage d-axis component $U_d$, voltage q-axis component $U_q$, the d-axis voltage reference value $U_{dref}$ and the q-axis voltage reference value $U_{qref}$; a difference value between the d-axis voltage reference value $U_{dref}$ and the voltage d-axis component $U_d$ are output as d-axis current reference value $i_{dref}$ after being controlled by PI controller; a difference value between the q-axis voltage reference value $U_{qref}$ and the voltage q-axis component $U_q$ is output as q-axis current reference value $i_{qref}$ after being controlled by PI controller; an input of the inner loop controller is the grid-side converter AC outlet current d-axis component $i_d$, the current q-axis component $i_q$, the d-axis current reference value $i_{dref}$, the q-axis current reference value $i_{qref}$, the voltage d-axis component $U_d$ and the voltage q-axis component $U_q$; an output result of a difference value between the d-axis current reference value $i_{dref}$ and the current d-axis component $i_d$ after being controlled by PI controller is added with $U_d - i_q * X$, to obtain a d-axis voltage modulation wave $U_{vdref}$; an output result of a difference value between the q-axis current reference value $i_{qref}$ and the current q-axis component $i_q$ after being controlled by PI controller is added with $U_q + i_d * X$, to obtain a q-axis voltage modulation wave $U_{vqref}$; wherein X is a connect reactance of the grid-side converter; the input of the trigger link is the d-axis voltage modulation wave $U_{vdref}$ and the q-axis voltage modulation wave $U_{vqref}$; the d-axis voltage modulation wave $U_{vdref}$ and the q-axis voltage modulation wave $U_{vqref}$ are subjected to dq/abc conversion and PWM modulation, and output trigger signals of each switching device in the grid-side converter.

2. The offshore wind farm low-frequency alternating-current uncontrolled rectification electric power transmission system according to claim 1, wherein the onshore converter station adopts a pseudo bipolar structure or a true bipolar structure; when the pseudo bipolar structure is adopted, the onshore converter station only installs a grounding device at a valve side of the converter transformer of the inverter; when the true bipolar structure is adopted, a rectifier and an inverter are provided at a positive pole of the onshore converter station; a rectifier and an inverter are provided at the negative pole of the onshore converter station; a high voltage end of the positive rectifier is directly connected to a high voltage end of the positive inverter, and a low voltage end of the negative rectifier is directly connected to a low voltage end of the negative inverter; a low voltage end of the positive rectifier is directly connected to a high voltage end of the negative rectifier, and a connection point between the low voltage end of the positive rectifier and the high voltage end of the negative rectifier serves as a neutral point of the DC side of the rectifier; the low-voltage end of the positive inverter is directed connected to the high-voltage end of the negative inverter, and the connection point of the low voltage end of the negative inverter and the high voltage end of the negative inverter serves as a neutral point of the DC side of the inverter, and at least one of the neutral points of the DC side of the rectifier and the inverter needs to be connected to a ground electrode.

3. The offshore wind farm low-frequency alternating-current uncontrolled rectification electric power transmission system according to claim 2, wherein the energy dissipation device comprises: an AC side energy dissipation device and a DC side energy dissipation device; the AC side energy dissipation device is directly connected to the wind farm side AC bus; the AC side energy dissipation device is provided by a step-down transformer, Delta-connected cascaded thyristors, and energy dissipation resistors; a rated frequency of the AC side energy dissipation device is the same as the rated frequency of the offshore AC system; the DC side energy dissipation device is installed between the positive and negative poles on the DC side of the inverter, and the DC side energy dissipation device is composed of cascaded IGBTs and the energy dissipation resistors; for an onshore converter station with a pseudo-bipolar structure, only one DC energy dissipation device needs to be installed, and the high voltage end of the DC energy dissipation device is connected to the positive pole of the DC side of the inverter; the low voltage end of the DC energy dissipation device is connected to the negative pole of the DC side of the inverter; for the onshore converter station with a true bipolar structure, A DC energy dissipation device is installed between the positive pole of the DC side of the inverter and the neutral point of the DC side, and a DC energy dissipation device is installed between the negative pole of the DC side of the inverter and the neutral point of the DC side.

4. The offshore wind farm low-frequency alternating-current uncontrolled rectification electric power transmission system according to claim 1, wherein each of the wind turbine generators adopts a full-power converter type wind turbine based on a permanent magnet synchronous generator.

5. The offshore wind farm low-frequency alternating-current uncontrolled rectification electric power transmission system according to claim 1, wherein the AC filter is connected to the wind farm side AC bus; the AC filter uses single tuning, double tuning, triple tuning or pure capacitor forms; a sum of reactive power of all AC filters under the rated fundamental voltage is 30% of a rated DC power of the onshore converter station.

6. The offshore wind farm low-frequency alternating-current uncontrolled rectification electric power transmission system according to claim 1, wherein the rectifier is composed of two rectifier units connected in series, each rectifier unit uses a three-phase six-pulse uncontrolled rectifier bridge, and each bridge arm in the three-phase six-pulse uncontrolled rectifier bridge is composed of several diodes connected in series and parallel;

the three-phase six-pulse uncontrolled rectifier bridge comprises: two rectifier units; the converter transformers on the rectifier side comprise: a first converter transformer and a second converter transformer;

wherein one of the rectifier units is connected to the first converter transformer using a Y0/Y wiring mode; the other rectifier unit is connected to the second converter transformer using a Y0/Δ wiring mode; a valve side phase difference between the first converter transformer and the second converter transformer is 30°.

7. The offshore wind farm low-frequency alternating-current uncontrolled rectification electric power transmission system according to claim 6, wherein when the inverter uses a modular multi-level converter, the inverter uses the Y0/Δ wiring mode to connect to the converter transformer; when the inverter uses 12-pulse line commutated converter, the inverter use the Y0/Y wiring mode to connect to the first converter transformer, and the inverter uses the Y0/Δ wiring mode to connect to the second converter transformer.

8. The offshore wind farm low-frequency alternating-current uncontrolled rectification electric power transmission system according to claim 1, wherein the grid-side converter of each wind turbine generator is controlled by constant power.

* * * * *